United States Patent [19]

Hansen et al.

[11] 4,323,474

[45] Apr. 6, 1982

[54] METHOD OF PRODUCING FOAM MATERIAL AND APPARATUS THEREFOR

[75] Inventors: Niels H. V. Hansen, Emmasvej; Erling H. Mikkelsen, Stokbrovej; Søren Vissing, Blåboervej, all of Denmark

[73] Assignee: P. Campen Maskinfabrik A/S, Aarhus V., Denmark

[21] Appl. No.: 85,654

[22] Filed: Oct. 17, 1979

[30] Foreign Application Priority Data

Oct. 16, 1975 [GB] United Kingdom ............... 40663/78

[51] Int. Cl.$^3$ ........................... B01J 13/00; B01F 3/04
[52] U.S. Cl. ................. 252/307; 252/359 E; 261/DIG. 26; 427/244
[58] Field of Search ............ 252/307, 359 E; 261/DIG. 26

[56] References Cited

U.S. PATENT DOCUMENTS

| | | | |
|---|---|---|---|
| 3,164,374 | 1/1965 | Ralph | 261/DIG. 26 |
| 3,620,306 | 11/1971 | Shepherd | 261/DIG. 26 |
| 3,723,340 | 3/1973 | Shepherd | 252/307 |
| 3,811,660 | 5/1974 | Cole, Jr. | 261/DIG. 26 |
| 3,916,023 | 10/1975 | Porter et al. | 261/DIG. 26 |

FOREIGN PATENT DOCUMENTS 1266052  3/1972  United Kingdom ............ 252/359 E

*Primary Examiner*—Richard D. Lovering
*Attorney, Agent, or Firm*—Craig and Antonelli

[57] ABSTRACT

A foam material, used, for example, as a backing material on rugs, is produced by continuously pumping a viscid raw material through a flow meter into a mixer in which the raw material is foamed up by controlled supply of an air flow. For maintaining the density of the foam constant the raw material is passed through a specific weight detector and the foaming air supply is controlled based on the measuring outputs of both the flow meter and the weight detector. According to the invention there is used two specific weight detectors, one at each side of the supply pump, and by processing their combined measuring outputs in a control calculator it is possible to eliminate a control inaccuracy otherwise resulting from the fact that the measurements partly refer to the raw material as under increased pressure compared with the ambient pressure where the foam leaves the mixer.

11 Claims, 2 Drawing Figures

METHOD OF PRODUCING FOAM MATERIAL AND APPARATUS THEREFOR

This invention relates to the preparation of foam material as used e.g. as a bottom layer on rugs and carpets. In a continuous production it is normal practice to pump a flow of a foam liquid and an air flow into a mixing and foaming apparatus from which the foam is discharged for the intended use, e.g. to a nozzle system above a moving web for applying the foam in an even layer onto the web. The web may then move further through a curing station in which the foam is caused to set.

It is of course important to control the respective flows in such a manner that a foam material of predetermined characteristics as to density and rate of flow is obtained, since it would be uneconomical to make use of a density which is higher than required or prescribed. It is known, therefore, to carry out a continuous detection of the specific weight of the foam liquid and to continuously detect the rate of flow. From the results of these detections it is possible to automatically calculate the correct intensity of the air flow as added to the mixer, and to therewith effect a corresponding automatic control.

In connection with latex and similar viscid liquids it is for various reasons necessary to place the flow meter on the pressure side of the pump, while the specific weight detector can be placed anywhere in the liquid flow pipe system, though most conveniently on the suction side of the pump, where it should not be constructed to resist the discharge pressure of the pump.

It has been found, however, that despite very accurate automatic detections of the specific weight and the flow rate and an accurate resulting air flow control it has proved difficult to achieve the desired uniformity of the density of the foam, and it is the purpose of this invention to provide an improved control system for achieving the said desired uniformity.

The invention is based on the discovery that in the viscid starting material there is usually incorporated a certain amount of air, e.g. due to the action of agitator wings in a storage container. When the specific weight is measured on the suction side of the pump this air will be under normal pressure or even slightly expanded and therewith produce a corresponding measuring result, while when the flow detection is made the material is under a very high pressure, i.e. the air in the material is compressed, and the flow measuring result will thus refer to a material of another specific weight than previously detected. If the specific weight detector was mounted on the pressure side of the pump it would well detect the weight of the same material as passing the flow meter, but this material would later on expand more than caused by the mixing air, i.e. the final material would tend to be of overdue thickness or density.

Now, if the air contents of the viscid liquid was a known constant it would be possible to effect a corresponding correction of the calculations and end with the desired result anyway. In practice, however, the air contents is not at all constant, e.g. because it may depend of the agitator means bringing more and more air into the liquid during the operation hours.

According to the invention the problem is solved by arranging for a specific weight detector on both the suction side and the discharge side of the pump and using both these detection results in the calculation of the liquid/air mixing ratio. The flow meter then detects the flow of a material of which also the specific weight is detected, while the detector on the suction or inlet side detects the specific material weight under pressure conditions very close to the final condition of the foam material. With these parameters available for the data processing a very accurate control of the final foam density is achievable.

BRIEF DESCRIPTION OF DRAWING

In the following the invention is described in more detail with reference to the accompanying drawing, in which:

FIG. 1 is a schematic view of a mixer device according to the invention, while

DETAILED DESCRIPTION OF INVENTION

Figure 1:
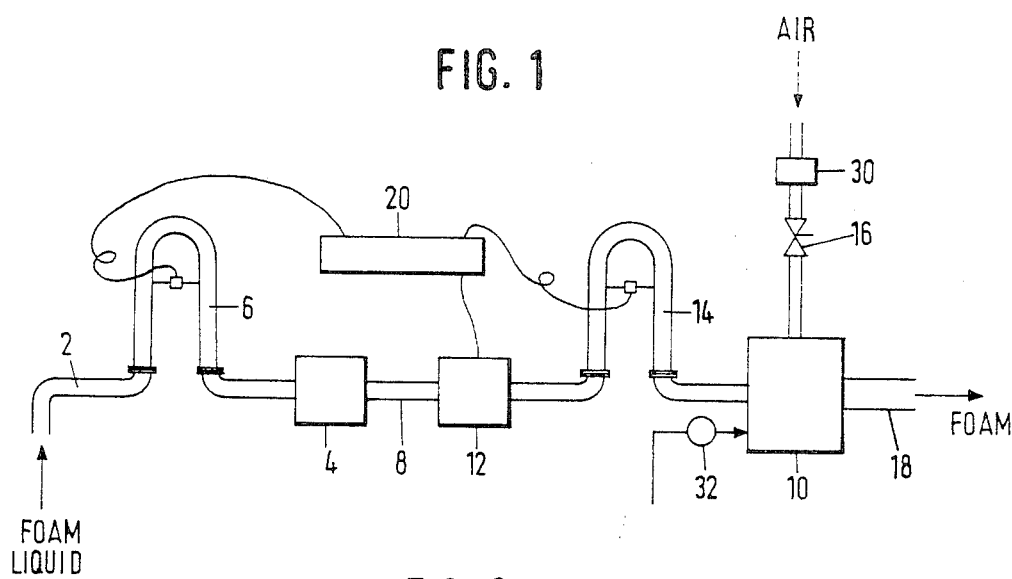

In the system shown in FIG. 1 the latex liquid is supplied from a storage tank (not shown) through an inlet pipe 2 to the suction side of a pump 4. In the pipe 2 is mounted a specific weight detector such as a conventional horizontal loop detector 6, the gravity of which is continuously detected by suitable gauge means. The discharge port of the pump 4 is connected to a pipe 8 leading to a mixer unit 10 through a flow meter 12 and another specific weight detector 14. The flow meter is of the type capable of handling viscid liquids, but to this end requiring the liquid to be forced through the meter with a relatively high pressure. In the mixer unit 10 a flow of mixing air is introduced via flow meter 30 through a servo controlled valve 16, and the foam material is delivered through an outlet pipe 18. A control unit 20 receives the measuring data from the meters 6 and 14 and pump 4 and is adapted to control the valve 16; it may also be connected with the pump motor control means and with pump means 32 for dosing an accelerator additive into the mixing unit.

Figure 2:
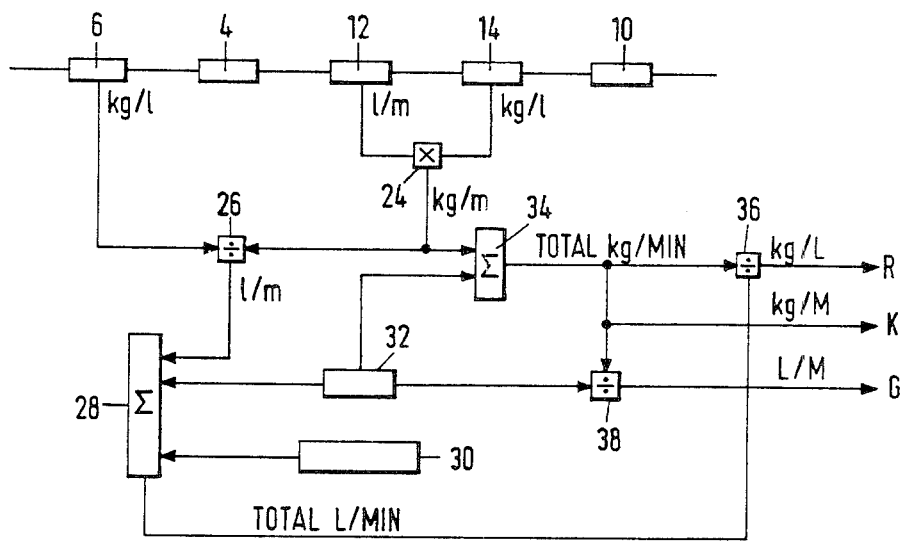
FIG. 2 is a schematic illustration of the calculating operations.

FIG. 2 illustrates the processing of the measuring results in the control unit 20. The signals from the units 12 and 14 on the pressure side of the pump are multiplied in multiplicator 24 whereby the result will be expressed in kg/min. In a divider 26 this result is divided into the result from the specific weight detector 6, whereby this result will indicate "liters per minute" of foam liquid at ambient pressure. In an adder 28 this result is brought together with a "l/min"-detection result from a flow meter 30 in the air pipe and with an "l/min"-information from the dosing pump 32 serving to supply the said additive to the mixer. The resulting signal from the adder 28 represents the total of liters per minute of the foam leaving the mixer 10.

A corresponding information as to the total of kg/min is obtained by adding, in an adder 34, the result of the multiplier 24 and the dosage kg/min (normally the same as the l/min-dosage) from the dosing pump 32, and when these results are brought together in a divider 36 the result will be in "kg/l," i.e. the actual specific weight of the foam material. This result, as taken out at terminal R, may be used to control the air valve 16 for adjusting the specific weight to the preset value.

The output of the adder 34 represents the total weight (per minute) of the foam, and this output, therefore, as taken out at K, may be used to control the means for regulating the pump 4 in order to adjust the foam weight per length unit of the web to which the foam is applied, i.e. the thickness of the foam layer.

Finally the dosage "kg/l" from unit 32 is divided by "total kg/l" from unit 34, in a divider 38, and the result, taken out at G, will show the additive dosage in percent and may be used to control the dosage pump to preset requirements.

It should be emphasized that the various means for measuring flow and specific weight and for automatically controlling the flow intensity as well as for effecting the desired calculations for control purposes may all be of conventional design, so it is deemed unnecessary to describe such means in more detail at this place. It may be mentioned that in practice it can be preferable to use, instead of one or both of the specific weight detectors 6 and 14 of the loop type, a corresponding detector of the column type, which as well known comprises a vertical tube projecting upwardly from the flow tube and having a topwise arranged air dome, whereby the specific material weight for a given pressure will be indicated by the height of the material column in the tube.

The invention is particularly well suited for the production of latex foam and similar materials, but the described problem as solved by the invention is recognized also in the production of some other types of foamed or whipped materials, even in the food industry.

It will be understood that the difference between the specific weight results of the two detectors 6 and 14 will be due to the compression of the material as caused by the pump, and when the degree of pressure increase is known a correct mixing control may then be effected even if the suction pressure deviates considerably from the ambient pressure where the foam is delivered.

It is known in the art to detect both flow rate and specific weight in an intermittent manner, e.g. based on sample collection during a known time interval, and measuring systems of this type would also be applicable in connection with the invention.

We claim:

1. A method of producing a foam material by continually
   supplying through a supply pump a pressurized flow of a material to be foamed into a mixer unit,
   supplying an adjustable gas flow to said mixer unit,
   causing the material to be foamed by the gas and exhausting the foam from the mixer in a continuous flow,
   measuring the flow rate of the material to be foamed,
   measuring the specific weight of the supply material flow at the input and output of said supply pump and
   controlling one of the gas flow and the material supply flow in response to said measurements for maintaining the density of the produced foam material as constant as possible.

2. A method according to claim 1, characterized by the use of a calculator, the method further comprising
   producing an output control signal representative of the "weight per volume unit" of the foam material as leaving the mixer, based on the "total weight per minute" of the supply material flow as found by a combined measurement of flow rate and specific weight of the flow at the discharge side of the pump and the "total volume per minute" of the foam leaving the mixer as found by a
   combined measuring of the rate of the gas flow to the mixer and the "volume per minute" of the supply material flow at the suction side of the pump, under pressure conditions substantially similar to the ambient pressure conditions of the foam upon its leaving the mixer,
   deriving said "volume per minute" of the supply flow before the pump from a specific weight measurement of the flow before the pump and a combined measurement of flow rate and specific weight of the flow after the pump, and
   controlling the supply of gas or material to the mixer in response to said output control signal.

3. A system for producing a continuous flow of a foam material, comprising
   an inlet for raw material to be foamed,
   a conduit for guiding the material to a mixer unit,
   means for adjustably supplying foaming gas to said mixer unit for successively foaming up the supplied raw material and
   outlet means for discharging the foam material,
   said conduit comprising
   a pump and
   a measuring system for performing one of the steps of intermittently and continuously measuring the "weight per minute" of the raw material flow and correspondingly effecting adjustment control of the supply rate of at least one of the foaming gas and the raw material so as to maintain the density of the foam substantially constant, characterized in that
   measuring means for the specific weight of the raw material are provided separately on both the suction side and the discharge side of the pump and are connected to
   a control unit operable to effect said adjustment control based on a measurement on the discharge side of the pump, but with a relevant correction derived from the measurement on the suction side of the pump.

4. A system according to claim 3, further comprising means for measuring the "weight per minute" of the raw material flow in a successive manner on the discharge side of the pump by means of a flow rate and specific weight measuring system, characterized in that the measuring output of the means for measuring the specific weight of the raw material on the suction side of the pump (in terms of weight per volume unit) is connected to a first divider unit also receiving the "weight per minute" signal from the measuring system on the discharge side of the pump and producing a resulting "volume per minute" signal, which is supplied to an adder unit together with signals representing the volume flow of the foaming gas and possible further additives to the raw material, said adder unit thus producing a "total volume per minute" signal, which is supplied to a second divider unit also receiving a "total weight per minute" signal constituted by the sum of said "weight per minute" signal and a corresponding signal referring to the possible supply of further additives, said second divider unit producing a "weight per volume unit" signal, which is used as the said adjustment control signal.

5. In a method of producing a foam material employing
   a mixer having inputs for gas and a compound, and
   a pump to supply said compound to said mixer, wherein are performed the steps of:
   a. measuring specific weight of compound at the input to said pump,
   b. measuring the specific weight of compound at the output of said pump, the improvement comprising
- c. generating at least one control signal in accordance with the results of steps a and b to control the density of foam produced at a constant level, and
- d. controlling the gas input rate to said mixer in response to said at least one control signal.

6. In a method of producing a foam material employing
- a mixer having inputs for gas and a compound,
- a pump to supply said compound to said mixer, wherein are performed the steps of:
- a. measuring specific weight of compound at the input to said pump,
- b. measuring the specific weight of compound at the output of said pump, the improvement comprising
- c. generating at least one control signal in accordance with the results of steps a and b to control the density of foam produced at a constant level, and
- d. controlling the throughput rate of said pump in response to said at least one control signal.

7. In a method of producing a foam material employing
- a mixer having inputs for gas and a compound,
- a dosing pump providing input to said mixer,
- a pump to supply said compound to said mixer, wherein are performed the steps of:
- a. measuring specific weight of compound at the input to said pump,
- b. measuring the specific weight of compound at the output of said pump, the improvement comprising
- c. generating at least one control signal in accordance with the results of steps a and b to control the density of foam produced at a constant level,
- d. measuring the volume per minute rate of said dosing pump,
- e. generating said control signal further in accordance with the results of a, b, and d, and
- f. controlling the input rate of said mixer from said dosage pump in response to said at least one control signal.

8. Apparatus for producing a foam material comprising
- means for mixing a gas with a material to be foamed received from two respective inputs to produce a foamed material,
- means for pumping said material to be foamed into said mixer,
- means for sensing the specific weight of material at the input and output of said means for pumping to provide respective control inputs, and
- means to control at least one of said inputs to said means for mixing in response to said control inputs.

9. Apparatus for producing a foam material as set forth in claim 8, further comprising
- means to control an input to said mixing means in response to the material flow rate through said means for pumping.

10. Apparatus for producing a foam material as set forth in claim 8, wherein said means to control further comprises
- means to control the flow rate of said means for pumping.

11. Apparatus for producing a foam material as set forth in claim 8, further comprising
- a dosing pump providing input to said means for mixing, and said means to control further comprises
- means to control the flow rate of said dosing pump to said mixer.

* * * * *